United States Patent [19]

Marshall

[11] Patent Number: 5,134,967
[45] Date of Patent: Aug. 4, 1992

[54] TEAT CUP FOR HYDRAULIC MILKING APPARATUS

[75] Inventor: Barry R. Marshall, Ramsden, England

[73] Assignee: Ambic Equipment Limited, England

[21] Appl. No.: 618,887

[22] Filed: Nov. 28, 1990

[30] Foreign Application Priority Data

Nov. 29, 1989 [GB] United Kingdom ............. 8926950

[51] Int. Cl.⁵ .............................................. A01J 5/04
[52] U.S. Cl. ............................................. 119/14.47
[58] Field of Search ............... 119/14.47, 14.48, 14.49, 119/14.5, 14.51, 14.52, 14.53

[56] References Cited

U.S. PATENT DOCUMENTS

| | | | |
|---|---|---|---|
| 3,255,732 | 6/1966 | Raht | 119/14.52 |
| 3,482,547 | 12/1969 | Maier | 119/14.52 |
| 3,874,338 | 1/1975 | Happel | 119/14.53 |
| 4,211,184 | 7/1980 | Abrahamson | 119/14.52 |
| 4,840,141 | 6/1989 | Marshall | 119/14.47 |
| 4,924,809 | 5/1990 | Verbrugge | 119/14.47 |
| 4,936,254 | 6/1990 | Marshall | 119/14.47 |

FOREIGN PATENT DOCUMENTS

| | | |
|---|---|---|
| 1632935 | 1/1968 | Fed. Rep. of Germany . |
| 2312756 | 3/1973 | Fed. Rep. of Germany . |
| 975757 | 11/1964 | United Kingdom ............. 119/14.49 |
| 2102665 | 7/1981 | United Kingdom . |
| 2119620 | 11/1983 | United Kingdom ............. 119/14.47 |
| 2189976 | 4/1987 | United Kingdom . |

Primary Examiner—Paul J. Hirsch
Assistant Examiner—Todd E. Manahan
Attorney, Agent, or Firm—Larson and Taylor

[57] ABSTRACT

A teat cup for hydraulic milking apparatus comprises a shell and a liner. The liner has a body part within the shell, a mouthpiece at one end of the body part which mouthpiece defines an opening for receiving a teat during milking, a short milk tube at the other end of the body part, for connection to a clawpiece, and an air passage extending through the body part from the inside to the outside thereof. The shell has a first inlet to which a vacuum pulse tube can be connected and in use pressurize the space between the shell and the liner body part, a second inlet to which an air admission tube can be connected and a passageway defined within the shell itself or within a part rigid therewith and communicating the second inlet to the air passage in the liner body part, whereby air may be admitted to the interior of the liner body part at will.

15 Claims, 2 Drawing Sheets

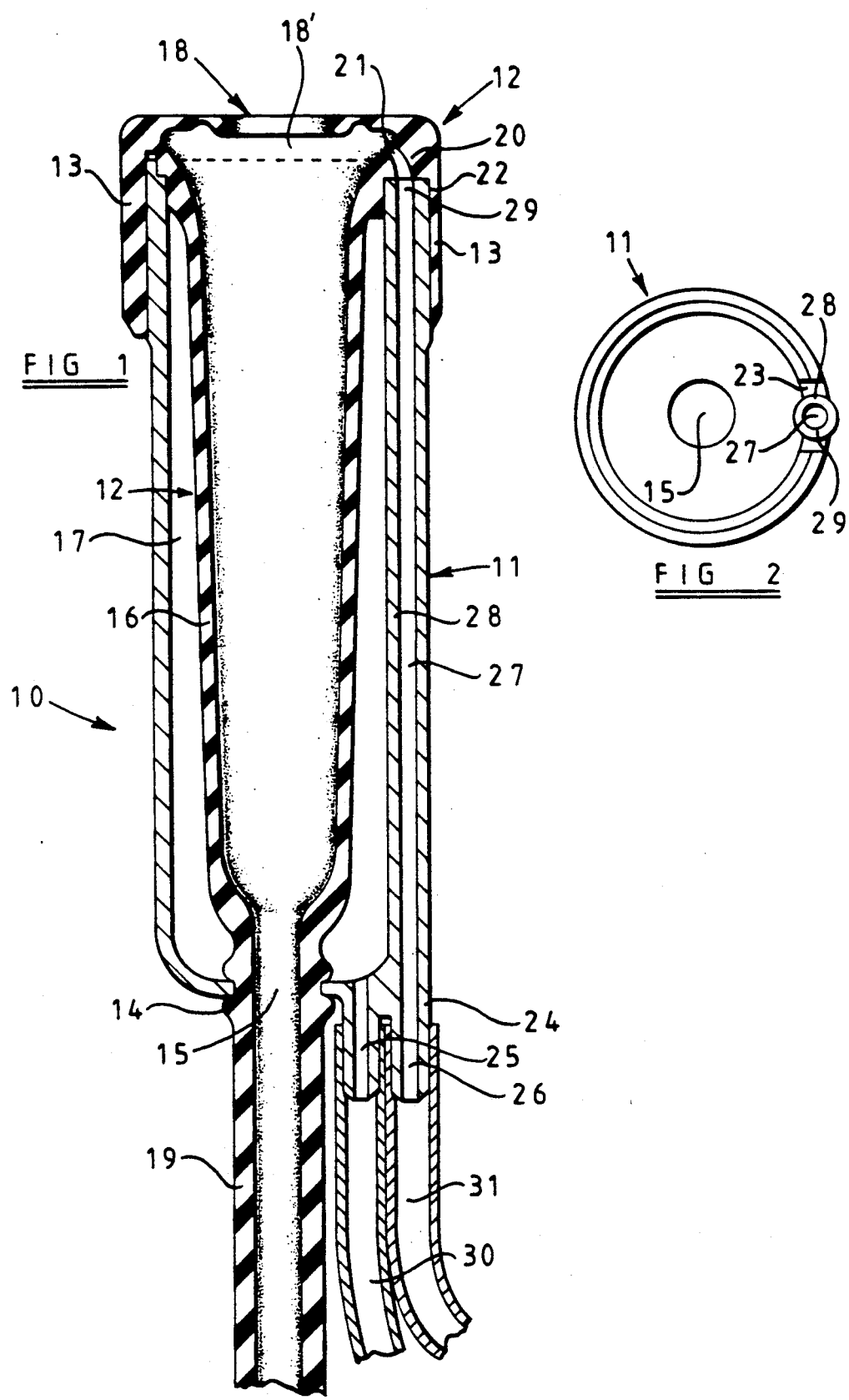

TEAT CUP FOR HYDRAULIC MILKING APPARATUS

INTRODUCTION

This invention relates to a teat cup for hydraulic milking apparatus and to hydraulic milking apparatus including a cluster of such teat cups.

Automatic milking apparatus includes, for each cow milking unit, a clawpiece and a cluster of four teat cups connected to the clawpiece. Each teat cup has a rigid shell and an internal flexible liner. This liner has a topmost mouthpiece with a circular opening, and a body part inside the shell. The liner extends through the bottom of the shell body as a short milk tube. This tube is connected to the clawpiece and thence, by way of a long milk tube, to a source of steady vacuum.

An annular space, between the teat cup shell and the teat cup liner, is connected to the clawpiece by a pulse tube and thence to a source of pulsating vacuum.

For milking, the four teat cups are placed around the cow's teats, the liner mouthpiece of each teat cup being fitted over the respective teat. The teat cups are held in position during the milking operation by adhesion, due to the steady vacuum applied for the milking operation. The pulsating vacuum applied between the teat cup liner and shell causes the liner body to expand and contract again, thus promoting the flow of milk by simulating suckling. After completion of the milking operation, the teat cup cluster is removed from the cow's teats, either manually or by automatic means.

In milking methods in which a continuous air bleed is provided at the clawpiece or upstream of the clawpiece, the steady vacuum induced adhesion is automatically broken when the vacuum supply is shut off at the end of milking, so that the teat cup cluster is easily removed from the milked cow.

However, a more modern milking method, known as the hydraulic milking method, has recently been introduced. In this hydraulic milking method, milk from the teats is drawn past one or more non-return valves and there is no air bleed into the milk flow upstream of the valve or valves during milking, that is to say during the process of drawing milk from an individual cow. In consequence, the steady vacuum induced adhesion of the teat cup liner to the cow's teat is not broken when the vacuum supply is shut off after milking. Some other means is thus needed to break the vacuum adhesion before the teat cups can easily be removed from the milked cow.

One means of doing this is disclosed in GB 2189976. According to GB 2189976, an air passage is provided through the body part of the liner in the vicinity of the mouthpiece and a flexible air admission tube, which forms part of the liner, is connected to the air passage, the air admission tube extending within the space between the shell and the liner body part and through a vacuum pulse tube to air admission control means, whereby air may be admitted to said body interior, at will, upon completion of the milking operation. However, this arrangement suffers from the drawback that assembly of the liner to the shell is awkward because of the need to insert the short milk tube through one opening in the bottom of the shell and to insert the flexible air admission tube through a pulse tube connector also in the bottom of the shell.

SUMMARY OF THE INVENTION

In seeking to mitigate this drawback, the present invention in one aspect provides a teat cup for hydraulic milking apparatus, comprising a shell and a liner, the liner having a body part within the shell, a mouthpiece at one end of the body part which mouthpiece defines an opening for receiving a teat during milking, a short milk tube at the other end of the body part, for connection to a clawpiece, and an air passage extending through the body part from the inside to the outside thereof and the shell having a first inlet to which a vacuum pulse tube can be connected to in use pressure the space between the shell and the liner body part, a second inlet to which an air admission tube can be connected, and an outlet communicating with the second inlet, the outlet being integral with or rigidly secured to the shell and being connected to the air passage in the liner body part, the arrangement being such that in use air may be admitted to the interior of the liner body part by way of the air admission tube, the second inlet and the outlet, at will.

Preferably, the outlet communicates with the second inlet by way of a passageway defined within the shell itself or within a part rigid therewith.

The present invention in another aspect provides a teat cup for hydraulic milking apparatus, comprising a shell and a liner, the liner having a body part within the shell, a mouthpiece at one end of the body part which mouthpiece defines an opening for receiving a teat during milking, a short milk tube at the other end of the body part, for connection to a clawpiece, and an air passage extending through the body part from the inside to the outside thereof, and the shell having a first inlet to which a vacuum pulse tube can be connected to in use pressure the space between the shell and the liner body part, a second inlet to which an air admission tube can be connected, and a passageway defined within the shell itself or within a part rigid therewith and communicating the second inlet to the air passage in the liner body part, whereby air may be admitted to the interior of the liner body part at will.

With this arrangement, assembly of the liner to the shell is simpler than in the known arrangement, and manufacture of component parts of the teat cup is easier and less costly.

Preferably, the said air passage in the liner body part communicates with the interior of the body part at a position adjacent to the mouthpiece.

Preferably, the second inlet is provided at the end of the shell remote from the liner mouthpiece, and in this case, if the air passage communicates with the interior of the body part at a position adjacent to the mouthpiece, the passageway will extend over substantially the entire length of the shell.

Advantageously, the passageway is defined within the shell itself and preferably within a protrusion on the inner and/or outer surface of the shell, although alternatively the passageway may be defined within a part rigidly secured to the shell.

Preferably, the first and second inlets are adjacent to one another.

Preferably, the liner and the shell have complementary means for angularly positioning the liner relative to the shell.

Preferably, the passageway terminates at one end within an outlet nipple which is connected to the air passage in the liner body part.

Preferably, the liner is formed as an integral unit, but alternatively the short milk tube is formed as a separate part.

The invention in a further aspect provides hydraulic milking apparatus comprising a cluster of four teat cups each according to either previous aspect of the invention, in combination with a clawpiece, said clawpiece having a pulsation block part and a milk flow part, each of said teat cups having the pulse tube thereof connected to a connector of the said pulsation block and having the said air admission tube thereof connected to an air-flow connector provided by said clawpiece, the short milk tube of each teat cup liner being connected to a connector of the said milk flow part of said clawpiece, said clawpiece further having a movable control member connected to a steady vacuum and milk flow control valve within said milk flow part of said clawpiece, and an air-inlet valve, controlling air-flow from atmosphere to the said air-flow connector, being linked to the said control member, said air-inlet valve being closed when the said steady vacuum and milk flow control valve is open and being open when the said steady vacuum and milk flow control valve is closed.

The invention will now be more particularly described, by way of example, with reference to the accompanying drawings.

BRIEF DESCRIPTION OF THE DRAWINGS

FIG. 1 is a sectional view showing one embodiment of a teat cup according to the present invention, FIG. 2 is a plan view of the shell of the teat cup shown in FIG. 1.

DESCRIPTION OF THE PREFERRED EMBODIMENTS

Figure 3:
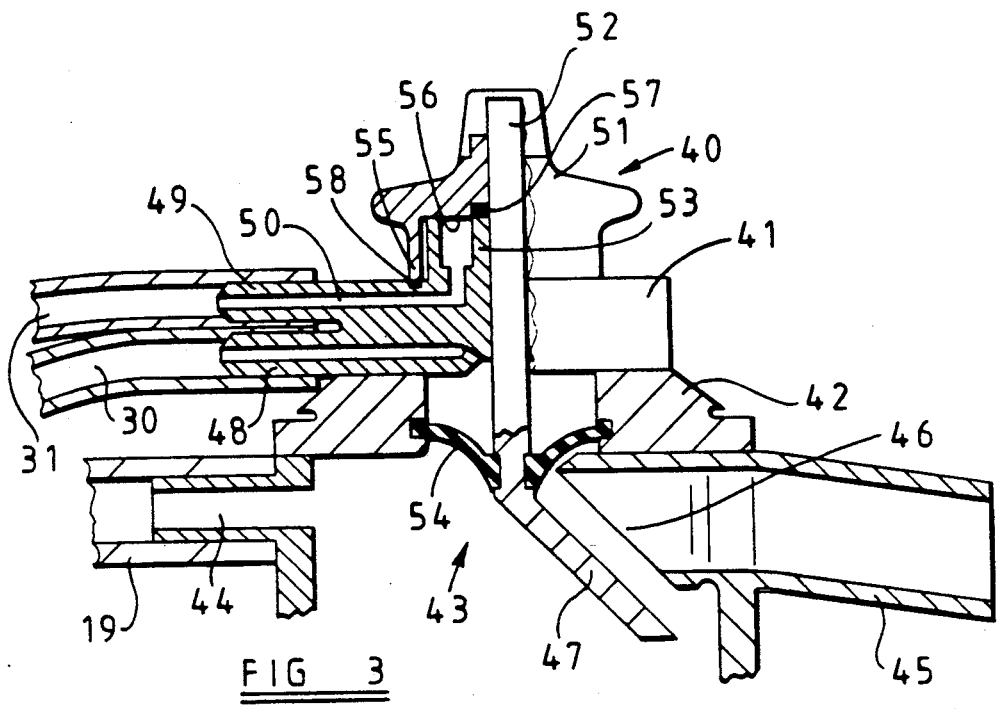
FIG. 3 is a part elevational, part sectional view of a clawpiece for hydraulic milking, showing a steady vacuum and milk-flow valve open and an air-inlet valve closed, as during a milking operation.

Referring firstly to FIGS. 1 and 2 of the drawings, the teat cup 10 shown therein is one of a cluster of four similar teat cups for hydraulic milking apparatus, and comprises a rigid shell 11 and a liner 12.

The liner 12 is of elastomeric material and fits inside the shell 11 and forms airtight seals therewith at the top by a downwardly extending skirt part 13 and at the bottom by an integrally moulded grommet 14 which fits tightly in an outlet hole 15 at the bottom of the shell 11. A body part 16 of the liner 12 extends within the shell 11, spaced from the inside wall of the shell 11 to leave an annular space 17 between the shell 11 and the liner 12. At its top, the liner 12 has a mouthpiece 18 with a central circular opening 18' dimensional to fit closely around the teat of a cow to be milked. At the bottom, below the grommet 14, the liner extends as an integrally moulded short milk tube 19, although this short milk tube could be provided as a separate part which is connected to the body part 16 of the liner 12.

The wall of the liner body part 16 has a thickened region 20 adjacent to the mouthpiece 18 and to one side, as shown at the top right in FIG. 1, and a passage 21 extends through the thickened region 20 from the outside to the inside of the body part 16.

The liner 12 also has an integral socket 22 between the skirt part 13 and the body part 16 which locates in a slot 23 in the upper end of the shell 11 to orientate the liner 12 relative to the shell 11 and prevent angular displacement therebetween. The socket 22 is aligned with the passage 21 and the interior of the socket 22 communicates directly with the passage 21.

The shell 11 has a connector 24 at its lower end. The connector 24 defines two inlets 25 and 26. The inlet 25 communicates with the annular space 17 between the shell 11 and the liner 12, and the inlet 26 communicates with a passageway 27 defined within an elongate, cylindrical bead 28, which is formed as an integral part of the shell wall and which defines a protrusion on the inner and outer surfaces of the shell wall, although the protrusion could be on the inner surface or outer surface only of the shell wall. The bead 28 extends along substantially the entire longitudinal extent of the shell 11 and terminates in an outlet nipple 29 disposed in the slot 23 in the upper end of the shell 11. When the liner 12 is fitted to the shell 11, this nipple 29 sealingly engages in the socket 22 so as to be connected in air-tight manner to the passage 21 in the thickened region 20 of the liner 12.

In the embodiment shown, the bead 28 is moulded integrally with shell 11. The passageway 27 could, however, be defined within an elongate part rigidly secured to the inner or outer surface of the shell such as by adhesive. Alternatively, the outlet nipple 29 alone could be integral with or rigidly secured to the shell 11, and the passageway 27 could be defined in a flexible tube (not shown) connected between the inlet 26 and the outlet nipple 29.

A pulse tube 30 is connected to the inlet 25 for applying a pulsating vacuum to the annular space 17, during milking, and an air admission tube 31 is connected to the inlet 26 to admit air into the interior of the liner body part 16 by way of the passageway 27, the nipple 29 and the passage 21, at will, upon completion of the milking operation.

As an alternative to using two separate tubes 30 and 31, the tubes may be of unitary construction, or they could be arranged one within the other and connected to a connector of appropriate design.

Referring now to FIG. 3, there is shown in part, generally in axial cross-section and part in elevation, a clawpiece shown generally at 40, comprising a pulsation block part 41 and a milk flow part 42.

The pulsation block 41 is of conventional form and, whether of simultaneous or alternate pulsation type, need not be described in detail in relation to the present invention. The milk flow part 42 of the clawpiece, in respects unrelated to the present invention and not described herein, is of known form for a clawpiece for hydraulic milking and may correspond to the multi-valve clawpiece described in GB 2057845.

The milk flow part 42 has a milk chamber 43, into which milk passes through a milk connector, one of four such connectors, to which the end of the short milk tube 19 of FIG. 1 is connected. The arrangement is shown diagrammatically by a milk connector 44 and the end of the short milk tube 19 fitted thereto. Milk passes out of the milk chamber 43 by way of a connector 45, which connector is connected by way of a long milk tube, not shown, to a milk tank and source of steady vacuum, in normal manner. The connector 45 extends into the body of the milk flow part 42, the inner end providing an aperture 46 which lies in a plane which is oblique to the axis of the inner portion of connector 45. A movable, plate-shaped valve 47 is provided to shut off the steady vacuum and the milk flow out of the clawpiece 40, in the position shown in FIG. 4, or permit the flow of milk and maintenance of steady vacuum within the clawpiece 40, in the position shown in FIG. 3.

The pulsation block 41 has a connector 48, 49, one of four such connectors, to which the ends both of the pulse tube 30 and the air admission tube 31 of FIG. 1 are connected. The part 48 provides connection of the pulse tube 30 to a source of pulsating vacuum in conventional manner. The part 49 provides connection of the air admission tube 31 to an air channel 50, which may be opened to atmosphere or closed by an air-inlet valve linked to the steady vacuum and milk flow control valve.

Figure 4:
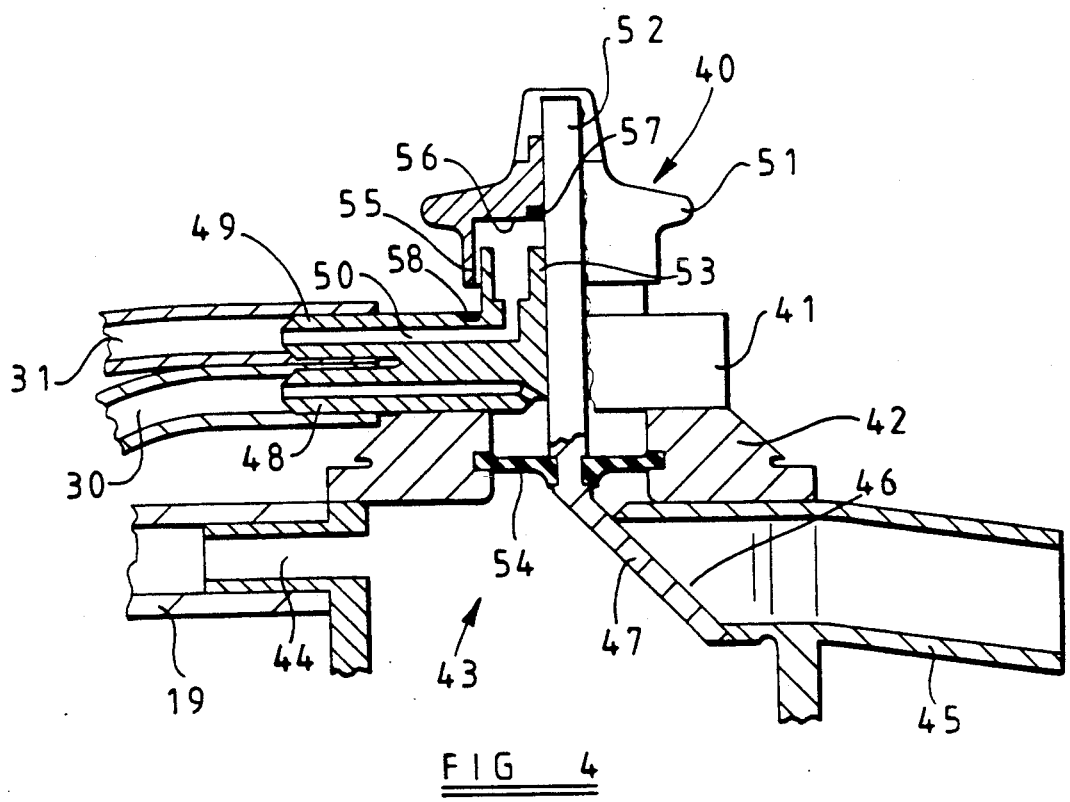
FIG. 4 is a corresponding view to FIG. 3, showing the steady vacuum and milk-flow valve closed and the air-inlet valve open, as at completion of a milking operation.

The construction of these two valves is shown in both FIG. 3 and 4. A control knob 51 positioned on top of the pulsation block 41 has a shaft 52 which extends through a bearing block 53, formed integrally with the pulsation block 41, and carries the plate-shaped valve 47 at its lower end. Near its lower end, the shaft 52 carries a flexible diaphragm 54, the circumferential edge of which is held in the body of the clawpiece 40, as is shown in the figures. The diaphragm seals the top of the milk chamber 43 from the pulsation block part 41 and also seals the air channel 50 from the milk chamber 43 due to the leakage path between the shaft 52 and bearing block 53. The control knob 51 is partly hollowed from its bottom to provide an outer skirt 55 and a circular top face 56, referenced in FIG. 4. Into the top face 56, around the shaft 52, is fitted an "O"ring 57 in a position such that it abuts the top end of the bearing block 53, see FIG. 3. Into the top face of the pulsation block 41, aligned with the outer skirt 55 of the control knob 51, is fitted an "O" ring 58, in a position such that the bottom face of the skirt 55 will abut it, see FIG. 3.

For milking operation, the control knob 51 is depressed into the position shown in FIG. 3. The steady vacuum pressure is transmitted into the milk chamber 43 and the valve 47 is opened to permit milk flow through the connector 45. At this time, the pressure above the diaphragm 54 will be substantially at atmospheric pressure, having equalled atmospheric pressure in the air channel 50 by leakage between the shaft 52 and bearing block 53. Vacuum pressure acting upon the underside of the diaphragm 54 will cause the control knob 51 to be held in the milk-flow position of FIG. 3. At the same time, the air-inlet valve constituted by the "O" rings 57 and 58 and the respective abutment surfaces will be closed, so that the air channel 50 is closed to the atmosphere and air is not admitted to the air admission tube 31 nor into the interior of the teat liner body part 16. Steady vacuum is transmitted by way of the short milk tube 19 to the teat liner body part 16; pulsating vacuum is transmitted from the pulsation bock 41, by way of the pulse tube 30, to the space 17 between the shell 11 and the liner 12, so that the milking operation proceeds in the normal manner of hydraulic milking.

Upon completion of milk flow from the cow being milked, the control knob 51 is lifted, either manually or by known automatic means as the case may be, so that the control knob 51 assumes the position shown in FIG. 4. Now, the plate-shaped valve 47 abuts the inner end of the connector 45, thereby closing the milk flow exit from the milk chamber 43 and stopping the admission of steady vacuum pressure thereto. In the raised position of the control knob 51 shown in FIG. 4, the respective abutment surfaces are removed from both "O" rings 57 and 58, and the air-inlet valve formed thereby is open to admit air from the atmosphere to the air channel 50. Air flows therefrom, by way of the air admission tube 31 to the passage 21. Since near vacuum pressure still persists in the interior of the teat cup liner 12, which at this time still retains the cow's teat which has been milked, air will pass through the passage 31 into the interior of the teat cup liner 12, beneath the mouthpiece 18 and around the cow's teat. Accordingly, the pressure within the teat cup liner 12 will rapidly rise to the atmospheric pressure outside the teat cup 10 and the easy removal of the teat cup 10, and correspondingly the other three teat cups of the cluster, is facilitated. In practice, the control knob 51 is raised slowly, from its FIG. 3 position to its FIG. 4 position, as will tend to be the case naturally, due to the initial vacuum pressure below the diaphragm 54. Closure of the vacuum and milk flow valve 47, 46 thus proceeds progressively. This enables residual milk still in the bottom of the part 16 of the liner 12 and the short milk tube 19, to flow through the milk chamber 43 and out through the connector 45, while the valve 47, 46 is still partially open. The air inlet valve to the air channel 50 is, of course, opened immediately the respective abutment surfaces are removed from the "O" rings 57 and 58, so that full flow of air is permitted through the air admission tube 31. This flow progressively equalises the air pressure within the teat cup liner 12 with the atmospheric pressure outside.

The above embodiment is given by way of example only and various modifications will be apparent to persons skilled in the art without departing from the scope of the invention. For example, the passage 21 is described as being adjacent to the mouthpiece 18. Whilst this is the preferred position for the passage 21, it is envisaged that this passage could be provided elsewhere in the body part 16 of the liner.

What I claim is:

1. A teat cup for hydraulic milking apparatus comprising a shell and a liner, the liner having a liner body part disposed within the shell so as to define a space between the shell and the liner body part, a mouthpiece at one end of the body part which mouthpiece defines an opening for receiving a teat during milking, a short milk tube at the other end of the body part, for connection to a clawpiece, and an air passage extending through the body part from the inside to the outside thereof, the shell having a first inlet and a second inlet and said teat cup comprising a vacuum pulse tube having a first end connected to the first inlet and a second end for connection to a pulsation block of the clawpiece so as to, in use, pressurize the space between the shell and the liner body part, an air admission tube having a first end connected to said second inlet and a second end for connection to an air inlet valve in the clawpiece, and an outlet communicating the with the second inlet, the outlet being integral with or rigidly secured to the shell and being connected to the air passage in the liner body part, the arrangement being such that in use air may be admitted to the interior of the liner body part by way of the air admission tube, the second inlet and the outlet, at will.

2. A teat cup as claimed in claim 1, wherein the outlet communicates with the second inlet by way of a passageway defined within the shell itself or within a part rigid therewith.

3. A teat cup for hydraulic milking apparatus, comprising a shell and a liner, the liner having a liner body part disposed within the shell so as to define a space between the shell and the liner body part, a mouthpiece at one end of the body part which mouthpiece defines an opening for receiving a teat during milking, a short milk tube at the other end of the body part, for connection to a clawpiece, and an air passage extending through the body part from the inside to the outside thereof, and the shell having a shell wall, a first inlet and a second inlet and said teat cup further comprising a vacuum pulse tube having a first end connected to said first inlet and a second end for connection to a pulsation block of the clawpiece so as to, in use, pressurize the space between the shell and the liner body part, an air admission tube having a first end connected to said second inlet and a second end for connection to an air inlet valve in the clawpiece, and a passageway, defined within the shell wall itself or within a part rigid therewith, connecting the second inlet to the air passage in the liner body part, whereby air may be admitted to the interior of the liner body part at will.

4. A teat cup as claimed in claim 3, wherein the said air passage in the liner body part communicates with the interior of the body part at a position adjacent to the mouthpiece.

5. A teat cup as claimed in claim 3, wherein the second inlet is provided at the end of the shell remote from the liner mouthpiece.

6. A teat cup as claimed claim 3, wherein the passageway is defined within a protrusion on the inner surface of the shell.

7. A teat cup as claimed in claim 3, wherein the first and second inlets are adjacent to one another.

8. A teat cup as claimed in claim 3, wherein the liner and the shell have complementary means for angularly positioning the liner relative to the shell.

9. A teat cup as claimed in claim 3, wherein the passageway terminates at one end within an outlet nipple which is connected to the air passage in the liner body part.

10. A teat cup as claimed in claim 3, wherein the passageway is defined within a protrusion on the outer surface of the shell.

11. A teat cup as claimed in claim 3, wherein the passageway is defined within protrusions on both the inner and outer surfaces of the shell.

12. Hydraulic milking apparatus comprising a cluster of four teat cups and a clawpiece, each of said teat cups comprising a vacuum pulse tube, an air admission tube, a shell and a liner, the liner having a liner body part disposed within the shell so as to define a space between the shell and the liner body part, a mouthpiece at one end of the body part which mouthpiece defines an opening for receiving a teat during milking, a short milk tube at the other end of the body part, for connection to said clawpiece, and an air passage extending through the body part from the inside to the outside thereof and the shell having a first inlet to which said vacuum pulse tube is connected so as to, in use, pressurize the space between the shell and the liner body part, a second inlet to which said air admission tube is connected, and an outlet communicating with the second inlet, the outlet being integral with or rigidly secured to the shell and being connected to the air passage in the liner body part, the arrangement being such that, in use, air may be admitted to the interior of the liner body part by way of the air admission tube, the second inlet and the outlet, at will, said clawpiece having a pulsation block part and a milk flow part, each of said teat cups having the pulse tube thereof connected to a connector of the said pulsation block and having the said air admission tube thereof connected to an air-flow connector provided by said clawpiece, the short milk tube of each teat cup liner being connected to a connector of the said milk flow part of said clawpiece, said clawpiece further having a movable control member connected to a steady vacuum and milk flow control valve within said milk flow part of said clawpiece, and an air-inlet valve, controlling air-flow from atmosphere to the said air-flow connector, being linked to the said control member, said air-inlet valve being closed when the said steady vacuum and milk flow control valve is open and being open when the said steady vacuum and milk flow control valve is closed.

13. A teat cup for hydraulic milking apparatus, comprising a shell and a liner, the liner having a liner body part disposed within the shell so as to define a space between the shell and the liner body part, a mouthpiece at one end of the body part which mouthpiece defines an opening for receiving a teat during milking, a short milk tube at the other end of the body part, for connection to a clawpiece, and an air passage extending through the body part from the inside to the outside thereof, and the shell having a shell wall, a first inlet to which a vacuum pulse tube can be connected to, in use, pressurize the space between the shell and the liner body part, a second inlet to which an air admission tube can be connected, and a passageway, defined within the shell wall itself or within a part rigid therewith, connecting the second inlet to the air passage in the liner body part, whereby air may be admitted to the interior of the liner body part at will, said second inlet being provided at the end of shell remote from the liner mouthpiece.

14. A teat cup for hydraulic milking apparatus, comprising a shell and a liner, the liner having a liner body part disposed within the shell so as to define a space between the shell and the liner body part, a mouthpiece at one end of the body part which mouthpiece defines an opening for receiving a teat during milking, a short milk tube at the other end of the body part, for connection to a clawpiece, and an air passage extending through the body part from the inside to the outside thereof, and the shell having a shell wall, a first inlet to which a vacuum pulse tube can be connected to, in use, pressurize the space between the shell and the liner body part, a second inlet to which an air admission tube can be connected, and a passageway, defined within the shell wall itself or within a part rigid therewith, connecting the second inlet to the air passage in the liner body part, whereby air may be admitted to the interior of the liner body part at will, said passageway being defined within a protrusion on the inner surface of the shell.

15. A teat cup for hydraulic milking apparatus, comprising a shell and a liner, the liner having a liner body part disposed within the shell so as to define a space between the shell and the liner body part, a mouthpiece at one end of the body part which mouthpiece defines an opening for receiving a teat during milking, a short milk tube at the other end of the body part, for connection to a clawpiece, and an air passage extending through the body part from the inside to the outside thereof, and the shell having a shell wall, a first inlet to which a vacuum pulse tube can be connected to, in use, pressurize the space between the shell and the liner body part, a second inlet to which an air admission tube can be connected, and a passageway, defined within the shell wall itself or within a part rigid therewith, connecting the second inlet to the air passage in the liner body part, whereby air may be admitted to the interior of the liner body part at will, said passageway being defined within protrusions on both the inner and outer surfaces of the shell.

* * * * *